US009189610B2

(12) United States Patent
Nakamura et al.

(10) Patent No.: US 9,189,610 B2
(45) Date of Patent: Nov. 17, 2015

(54) PROJECTION TYPE IMAGE DISPLAY DEVICE

(71) Applicant: Hitachi Maxell, Ltd., Osaka (JP)

(72) Inventors: Tatsuro Nakamura, Yokohama (JP); Masaaki Takatsuji, Foster City, CA (US); Atsushi Maruyama, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/265,783

(22) Filed: Apr. 30, 2014

(65) Prior Publication Data

US 2014/0298451 A1     Oct. 2, 2014

Related U.S. Application Data

(63) Continuation of application No. 13/240,326, filed on Sep. 22, 2011, now Pat. No. 8,754,830, which is a continuation of application No. 11/412,983, filed on Apr. 28, 2006, now Pat. No. 8,044,880.

(30) Foreign Application Priority Data

Apr. 28, 2005    (JP) ................................ 2005-130744
Feb. 23, 2006    (JP) ................................ 2006-046117

(51) Int. Cl.
| | |
|---|---|
| *H04L 29/06* | (2006.01) |
| *G06F 21/31* | (2013.01) |
| *G03B 21/14* | (2006.01) |
| *H04N 5/74* | (2006.01) |

(52) U.S. Cl.
CPC ................ *G06F 21/31* (2013.01); *G03B 21/14* (2013.01); *H04N 5/74* (2013.01)

(58) Field of Classification Search
CPC ................................ G06F 21/88; G06F 21/31
USPC ........................................................... 726/5
See application file for complete search history.

(56) References Cited

U.S. PATENT DOCUMENTS

| | | | |
|---|---|---|---|
| 4,829,589 A | 5/1989 | Uekusa | |
| 5,757,270 A | 5/1998 | Mori | |
| 5,802,728 A * | 9/1998 | Karnick et al. ............ 33/366.18 |
| 6,307,470 B1 | 10/2001 | Shirakawa | |
| 2004/0119945 A1* | 6/2004 | Nakamura et al. .............. 353/30 |

(Continued)

FOREIGN PATENT DOCUMENTS

| | | |
|---|---|---|
| JP | 09-284691 | 10/1997 |
| JP | 2004-077967 | 3/2004 |
| JP | 2005-301177 | 10/2005 |

*Primary Examiner* — Jason K Gee
(74) *Attorney, Agent, or Firm* — Baker Botts L.L.P.

(57) ABSTRACT

A projection type image display device provided with an unauthorized use preventing system includes a button unit or a remote controller for operating the display device, a condition memory for storing information indicating at least one use condition in an authorized use of the display device, a password memory for storing a password for releasing a restriction on the use of the display device, a detector for detecting a used condition of the display device at a power on timing, and a processor for imposing restrictions on the use of the display device when the use condition detected by the detector does not match the at least one use condition indicated by the information stored in the condition memory and for relieving the restriction based upon input of the password.

14 Claims, 21 Drawing Sheets

(56) References Cited

U.S. PATENT DOCUMENTS

| | | | |
|---|---|---|---|
| 2005/0004752 A1* | 1/2005 | Choi et al. ................ 701/207 |
| 2005/0012907 A1 | 1/2005 | Inoue | |
| 2006/0036781 A1 | 2/2006 | Thacker | |
| 2006/0164242 A1* | 7/2006 | Aoyanagi ................ 340/568.1 |

* cited by examiner

| Correcting Value 1 | ・・・ |
|---|---|
| Correcting Value 2 | ・・・ |

PROJECTION TYPE IMAGE DISPLAY DEVICE

CROSS REFERENCE TO RELATED APPLICATION

This application is a continuation of U.S. application Ser. No. 13/240,326, filed Sep. 22, 2011, which, in turn, is a continuation of U.S. application Ser. No. 11/412,983, filed Apr. 28, 2006 (now U.S. Pat. No. 8,044,880), the contents of which are incorporated herein by reference.

BACKGROUND

The present invention relates to a projection type image display device provided with an unauthorized use inhibiting mechanism. These days, uses of projection type image display devices inclusive of projectors are rapidly spreading in a variety of applications, such as presentation at conferences, lecturing in the fields of education, viewing films at home theaters, and so on. Because of the relative easiness of carrying the display devices, though they are expensive products, damages of theft of the display devices are tending to increase. As countermeasures against theft and unauthorized use of them, manufacturers are providing the products with such functions as to nullify changes made to settings and to lock the screen with use of password protection. An example of such art is disclosed in Japanese Patent Unexamined Publication No. 2004-77967.

According to the above mentioned art disclosed in Japanese Patent Unexamined Publication No. 2004-77967, a user at the time when starting up the device is requested to input his password and, only when the input password coincides with the password previously input by the rightful user, operation of the device is allowed and, thereby, unauthorized use of the device is prevented. However, it has been necessary even for a rightful owner of the device, when he uses the device, to input his password for verification of his ownership and therefore operation of the device has been very troublesome.

SUMMARY

The present invention is aimed at providing a projection type image display device that has an unauthorized use preventing function and yet can keeps its operability from deterioration.

To give an embodiment of the present invention, it is arranged in a projection type image display device such that first information indicative of a condition, while being used, of the device is stored in a memory, a condition, while being used, of the projection type image display device is detected at predetermined timing by a detector, and the use of the projection type image display device is restricted when a second condition, while being used, of the device detected on the basis of the first information stored in the memory disagrees with the condition, while being used, of the device indicated by the first information.

To give another embodiment of the present invention, it is arranged in a projection type image display device such that a setting value of a specific function of the device is stored in a memory at predetermined timing and when a processor detects that a change to the setting value has been made, the use of the projection type image display device is restricted.

DETAILED DESCRIPTION

A preferred embodiment of the present invention will be described below with reference to the accompanying drawings. In every drawing that follows, elements having like function will be marked with like marks and description of the components once described will be omitted thereafter.

In the following embodiment, occurrence of a theft is presumed by detection of a change in an installation condition or setup condition of a projection type image display device (hereinafter may sometimes be briefly called "device" unless it incurs a question) and thereby a system preventing an unauthorized use of the device following the theft is realized. In the installation condition and setup condition of the device, there are included various types of conditions whose changes are detectable. The installation conditions for example include (1) the attitude of the device, (2) the orientation of the device, (3) the place of installation, (4) the condition of an input to the input terminal, and (5) the fixing condition of the device. The setup conditions for example include (1) focus/zoom setup condition of the lens, (2) the projected image distortion correcting value, and (3) the projected image inversion setup condition. According to each of the conditions, the objects to be inspected vary as shown in Table 1. Details about them will be discussed later. Hereinafter, the above mentioned conditions will be generically called "used conditions" of the projection type image display device.

In the present invention, occurrence of theft is presumed by a change in the installation condition (the attitude, in this case,) of the device, and when a change is detected, authentication of the user (judgment, for example, by an input password). Thus, the complicated operation (procedure) of authentication check routinely practiced so far can be simplified, the frequency of the authentication check is decreased, and troublesome operations can be lightened.

Figure 1:
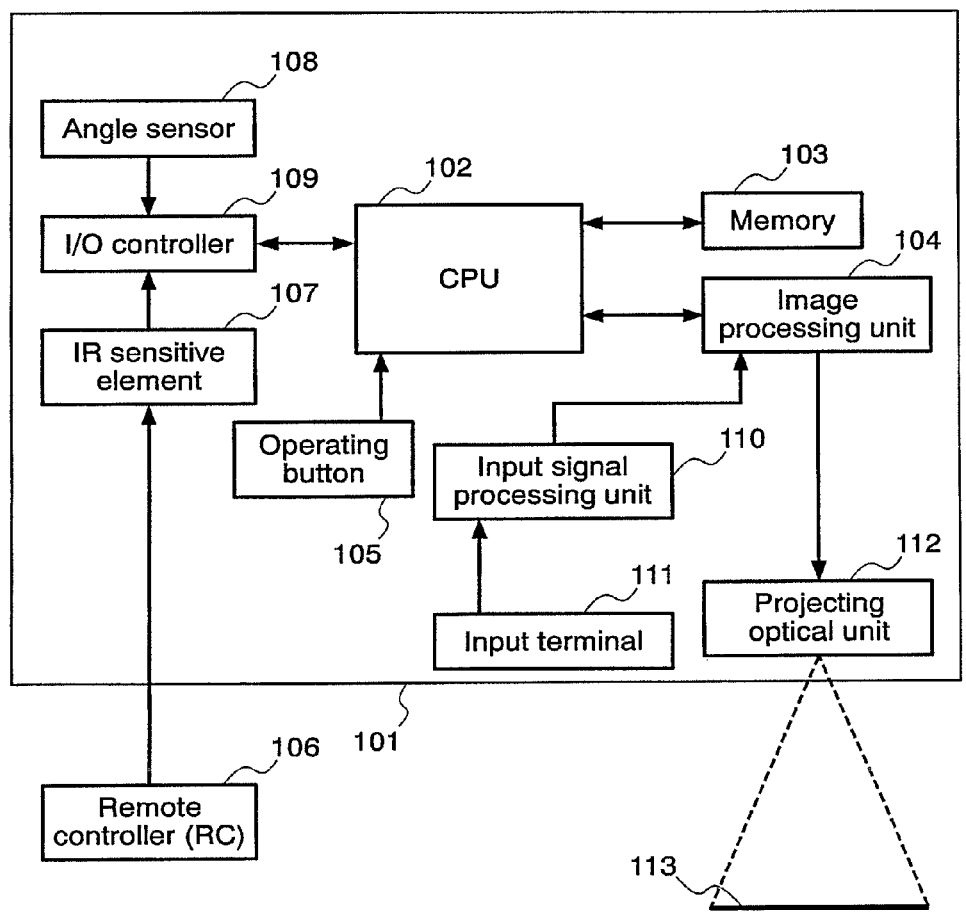
FIG. 1 is a block diagram of a projection type image display device according to a first embodiment.

FIG. 1 is a block diagram of a projection type image display device according to a first embodiment. Referring to FIG. 1, reference numeral 101 denotes the projection type image display device, 111 denotes an input terminal to which a video signal (not shown) is input, 110 denotes an input signal processing unit performing predetermined image processing on the video signal input from the input terminal 111, 104 denotes an image processing unit performing image processing, such as decoding and scaling, and on-screen displaying, on a video signal output from the input signal processing unit 110, 112 denotes a projecting optical unit for magnifying and projecting an image processed in the image processing unit 104, and 113 denotes a screen for displaying an image projected thereon. Reference numeral 105 denotes an operating button unit made up of a plurality of buttons disposed on an enclosure, not shown, of the device, 106 denotes a remote controller (hereinafter briefly called "RC") using an infrared remote control signal (hereinafter, briefly called "IR remote signal") for remote controlling the projection type image display device, 107 denotes an IR sensitive element for sensing an IR remote signal from the RC 106, 108 denotes an angle sensor detecting an attitude angle formed between the device and gravitation and used as a mechanism to read out a change in the attitude of the device from a change in the detected values, 109 denotes an I/O controller for controlling inputs from the IR sensitive element 107 and the angle sensor 108, 102 denotes a Central Processing Unit (hereinafter called "CPU") for performing operation control of the entirety of the projection type image display device, and 103 denotes a memory for storing a program for controlling the CPU 102 and various data such as the used conditions of the device and passwords. A video signal (not shown) input from the input terminal 111 is subjected to predetermined processing in the input signal processing unit 110 and the image processing unit 104, and an optical image (picture image) corresponding to the video signal is projected, for example, onto the screen 113 by the projecting optical unit 112. ON/OFF control of the device and operations for functions performed by the device, settings in the device and the like are performed by the operating button unit 105 or the RC 106, and the CPU 102 performs processing corresponding to operated buttons (not shown) of the operating button unit 105 or corresponding to an IR remote signal received through the IR sensitive element 107 and the I/O controller 109.

For example, when start-up setting of a system for preventing an unauthorized use of the projection type image display device has previously been made ready by an operation with use of operating button unit 105, the CPU 102 obtains, when the power to the device is turned on, an attitude angle of the projection type image display device detected by the angle sensor 108, through the I/O controller 109. The obtained attitude angle is checked up with an attitude angle previously registered in the memory 103 by a rightful user, whereby the amount of change in the attitude angle is calculated. The CPU 102 judges whether a theft has occurred based on the amount of change and determines whether an authentication check of the user is to be made or not. If the CPU 102 determines that the authentication is not necessary, it permits the user to perform operations that follow. If not, it carries out the authentication of the user. In the event that the password previously stored in the memory 103 by the rightful user is then input with use, for example, of the operating button unit 105, it permits the operation of the device. The above mentioned processing made by the CPU 102 will be described in detail with use of a flowchart.

There are types of angle detectors having one sensitive axis, two sensitive axes, and three sensitive axes. Any of those types can be used as the angle sensor 108. As the memory 103 for storing detected attitude angle data, EEPROM and FLASHROM can for example be mentioned. Incidentally, when a function equivalent to that of the I/O controller 109 is incorporated in the CPU 102, each device connected to the I/O controller may be directly connected to the CPU.

Figure 2:
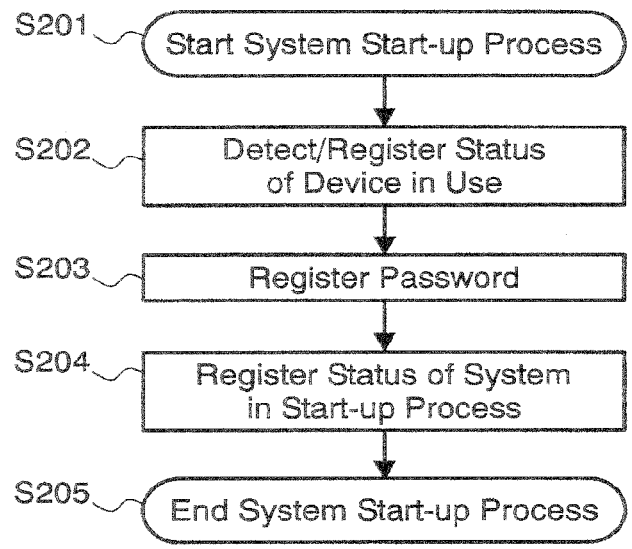
FIG. 2 is a flowchart showing a start-up process of an unauthorized use preventing system.
Figure 3:
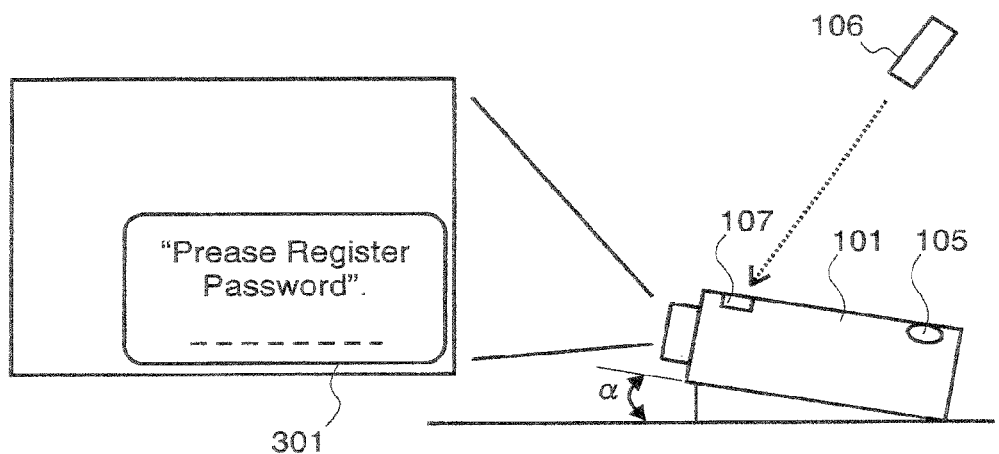
FIG. 3 is a drawing showing an embodiment of password registration.

Processing operations of the CPU 102 related to an unauthorized use preventing system will be described now with the use of flowcharts of FIG. 2 and FIG. 4. FIG. 2 is a flowchart showing processes for system start-up setting of the unauthorized use preventing system. After the power is turned on, if instructions to start the unauthorized use preventing system are issued from operating button unit 105 or the RC 106 of FIG. 1, the CPU 102 starts a system start-up process of the unauthorized use preventing system at step (hereinafter briefly called "S") 201, i.e., it detects, via the I/O controller 109 and with use of the angle sensor 108, the used condition of the device at that time, particularly, in the present embodiment, the attitude angle α indicating the attitude of the device as shown in FIG. 3, and stores the value in the memory 103 (S202). Then, it displays a password registration requesting screen 301 as shown in FIG. 3 by use of the image processing unit 104 to urge the user to register the password for user authentication. If the password is registered by the user with use of the operating button unit 105 or the RC 106, the CPU 102 registers the password in the memory 103 (S203). Here, a password means designation of a string of numbers, characters, or displayed special marks in a specific sequence or depressing specific buttons or RC keys in some order. Then, it is registered in the memory 103 that the projection type image display device has the unauthorized use preventing system started up (S204) and after the start-up process of the unauthorized use preventing system is ended (S205), normal operation of the device is started.

Figure 4:
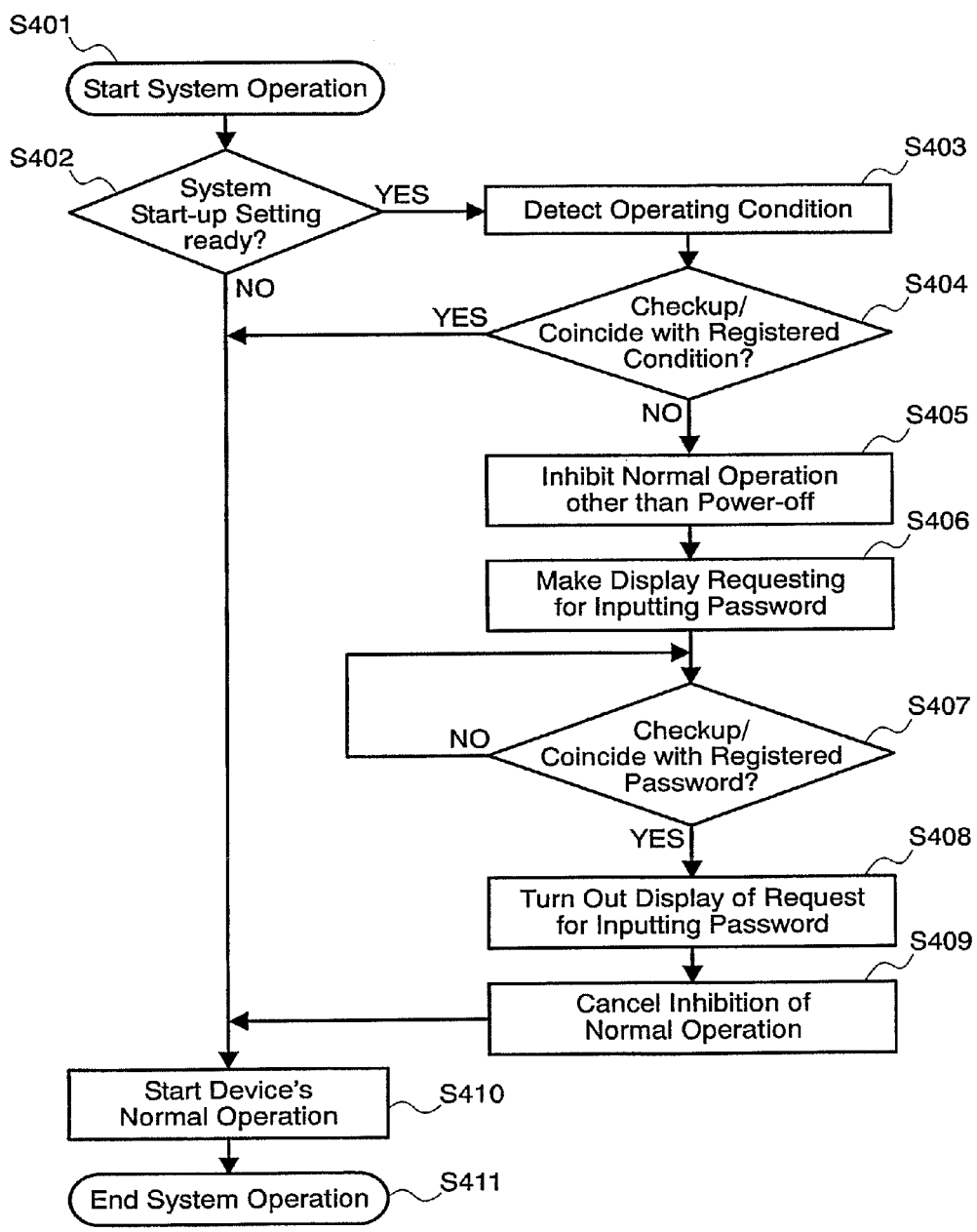
FIG. 4 is a flowchart showing an operating process of an unauthorized use preventing system.
Figure 5:
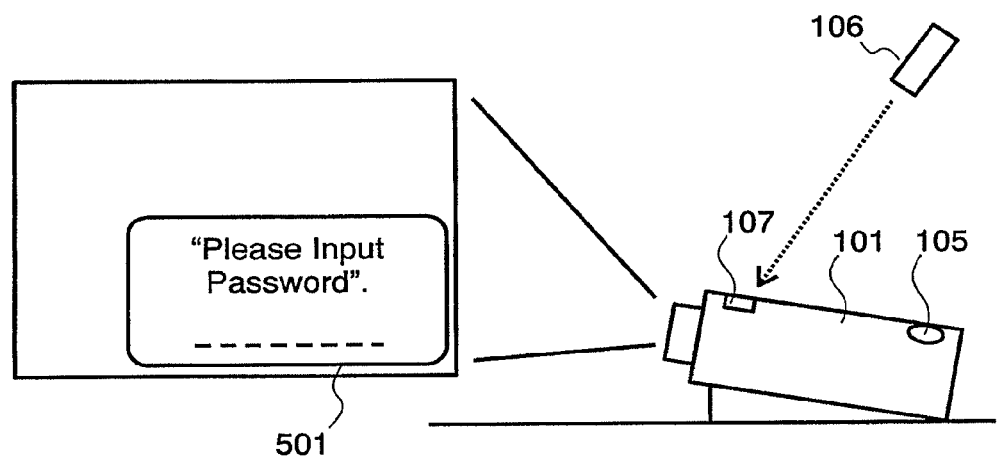
FIG. 5 is a drawing showing an embodiment of password registration.

FIG. 4 is a flowchart showing operating processes of an unauthorized use preventing system which starts upon power-on. Referring to FIG. 4, upon the power to the projection type image display device is turned on, the CPU 102 starts the operation of the unauthorized use preventing system (S401) and confirms at start whether the unauthorized use preventing system start-up setting is ready (on) by checking the set-up condition of the unauthorized use preventing system stored in the memory 103 (S402). If it is found that the start-up of the unauthorized use preventing system is not set at S402, proceeding advances to S410, where the device as it is is allowed to operate normally. If, on the other hand, it is found that the start-up of the unauthorized use preventing system is set at S402, the used condition of the device, i.e., the attitude angle α indicating the attitude of the device is detected with use of the angle sensor 108 (S403) and the thus detected attitude angle (hereinafter called "detected angle") is checked up with the attitude angle α that is stored in the memory 103 (S404). In the checkup of the detected angle with the registered attitude angle at this time, by taking the accuracy of the angle sensor 108 into consideration, a margin, for example, of ±2 degrees or so may be allowed for the detection error of the angle sensor. Upon the checkup of the detected angle with the registered attitude angle, if it is found that they are coincident with each other or within the margin of error, it is considered that there has been made no change to the used condition (namely, the attitude of the device in this case) and therefore there has occurred no theft, and processing advances to S410, where the device as it is allowed to start its normal operation and the process of operating the unauthorized use preventing system is ended (S411). If the detected angle disagrees with the registered attitude angle at S404, occurrence of a theft is presumed and therefore normal operations other than the power-off operation are inhibited at S405, the password inputting requesting screen 501 shown in FIG. 5 is displayed with use of the image processing unit 104 to urge inputting of a password (S406), and then it is determined whether the input password coincides with the registered password at S407. Needless to say, normal operations other than the power-off operation are inhibited until the registered password is input with use of the operating button unit 105 or the RC 106. When the input password is found to be coincident with the registered password at S407, the password inputting requesting screen 501 is erased (S408), the prohibition of normal operations is cancelled (S409), normal operations are started (S410), and the operating process of the unauthorized use preventing system is ended (S411). At this time, in the event that wrong password have been input a predetermined number of times (for example five times) in succession, it may be practiced to inhibit even inputting of a password and make the use of the device completely impossible.

In the present embodiment as described above, it is arranged such that, if a change in the used condition of the device (i.e., a change in the attitude angle in the case of the present embodiment) has been detected, an unauthorized use following a theft of the device is presumed and an authentication check is conducted. If, however, no change has been detected, it is judged that there is involved no unauthorized use following a theft and, hence, the step of authentication check is omitted. By making such an arrangement, a troublesome authentication check during the normal operation can be eliminated. Namely, complicated operations of authentication check are eliminated to simplify the operations of the system. Thus, it is made possible to realize an unauthorized use preventing system of projection type image display devices, while preventing its operability from being lowered.

Incidentally, there is a type of projection type image display device originally provided with an angle sensor for such purpose as correction of projected image distortion (so-called "keystone distortion") due to the attitude angle of the device. In such case, by using the sensor also for the detector of a used condition, the need for newly adding an angle sensor can be eliminated and a cost increase can be suppressed.

Figure 6:
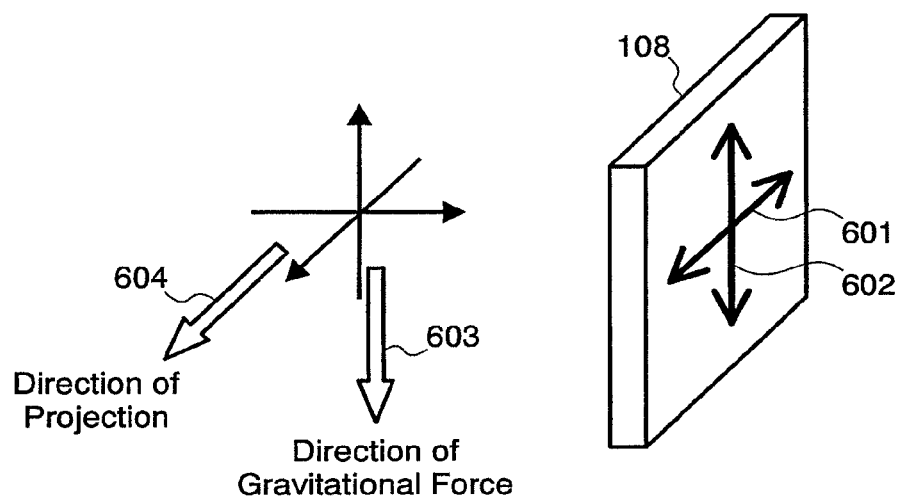
FIG. 6 is an example of installation of an angle sensor.
Figure 7:
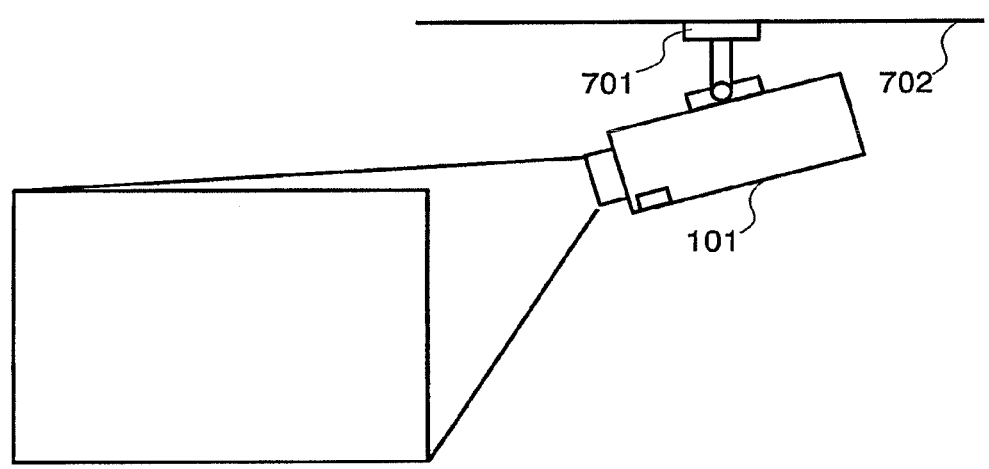
FIG. 7 is a drawing showing a condition of a ceiling fixture of a projection type image display device.

If the one having two sensitive axes or three sensitive axes is used as the angle sensor 108, then by disposing the device such that both a plane formed by two crossing axes of the sensitive axes and a plane formed by the direction of the gravitational force and the direction of the projection are held parallel to each other, it is made possible not only to detect the attitude angle but also to discriminate whether the device is placed on the floor or fixed onto the ceiling, and therefore the attitude angle of the device can be defined more finely. When, for example, an angle sensor 108 having two axes as the sensitive axes as shown in FIG. 6 is used, by disposing it such that the plane formed by the sensitive axis 601 and the sensitive axis 602 and a plane formed by the direction of gravitational force 603 and the projected direction 604 are parallel to each other, the attitude angle can be detected by use of the sensitive axis 601 and discrimination between installation on the floor and installation on the ceiling can be made by use of the sensitive axis 602. Here, the above mentioned installation on the floor means a style of installation with the top face of the device turned upward. And, the installation on the ceiling means the installed state of the device turned upside down from the installed state on the floor, an example thereof being a style of installation as seen when the device 101 is fixed onto the ceiling 702 with use of fixings (ceiling fixtures) 701 or the like as shown in FIG. 7.

Further, in addition to the use of the unauthorized use preventing system described in the present embodiment, if a logo seal 801 giving an alarm to the effect that the device will not operate normally if its installed condition is wrongly changed is attached onto the enclosure of the projection type image display device 101 where the seal is easy to see, it is made possible to let surrounding people to notice that the unauthorized use preventing system is in operation and, thus, it is made possible to prevent a theft more effectively.

Figure 9:
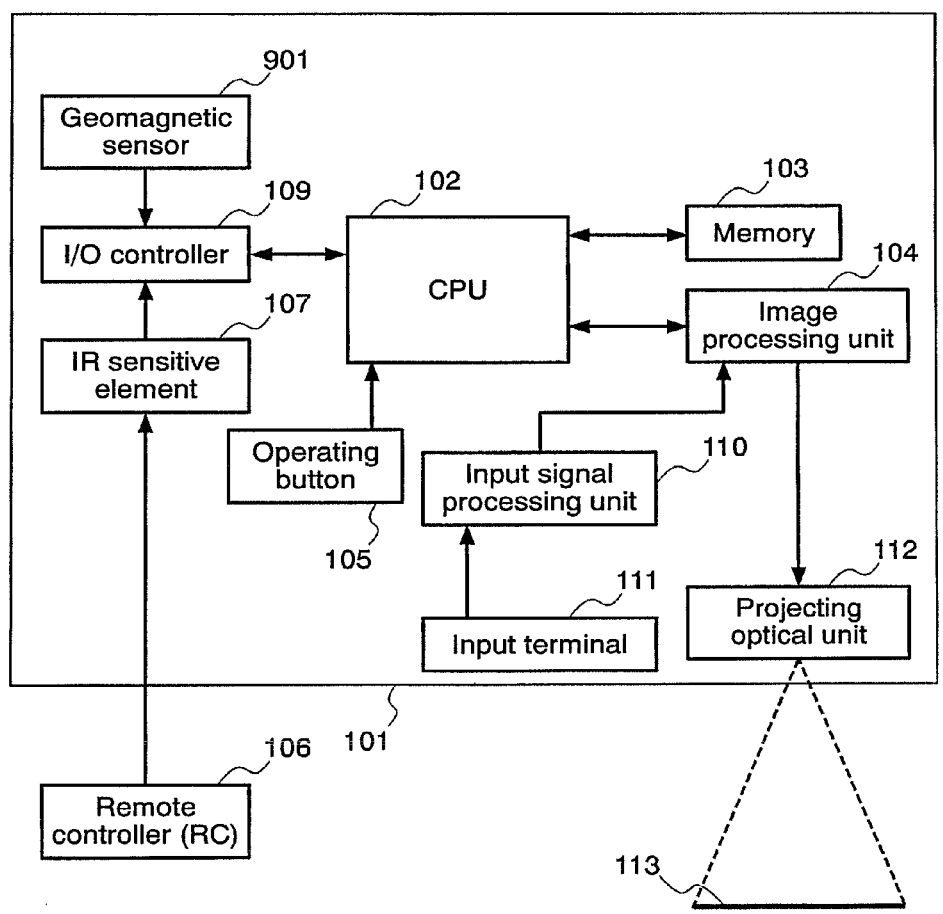
FIG. 9 is a block diagram of a projection type image display device according to a second embodiment.

FIG. 9 is a block diagram showing a projection type image display device according to a second embodiment. Although occurrence of a theft has been presumed in the first embodiment on the basis of a change in the attitude angle, the orientation of the device as an aspect of the used conditions (refer to Table 1) is detected in the present second embodiment with use of the geomagnetic sensor 901 shown in FIG. 9 instead of the angle sensor 108, and thereby occurrence of a theft is presumed on the basis of a change in the installed orientation of the device. Otherwise, the present embodiment is like the first embodiment and therefore explanation of the same will be omitted.

Figure 10:
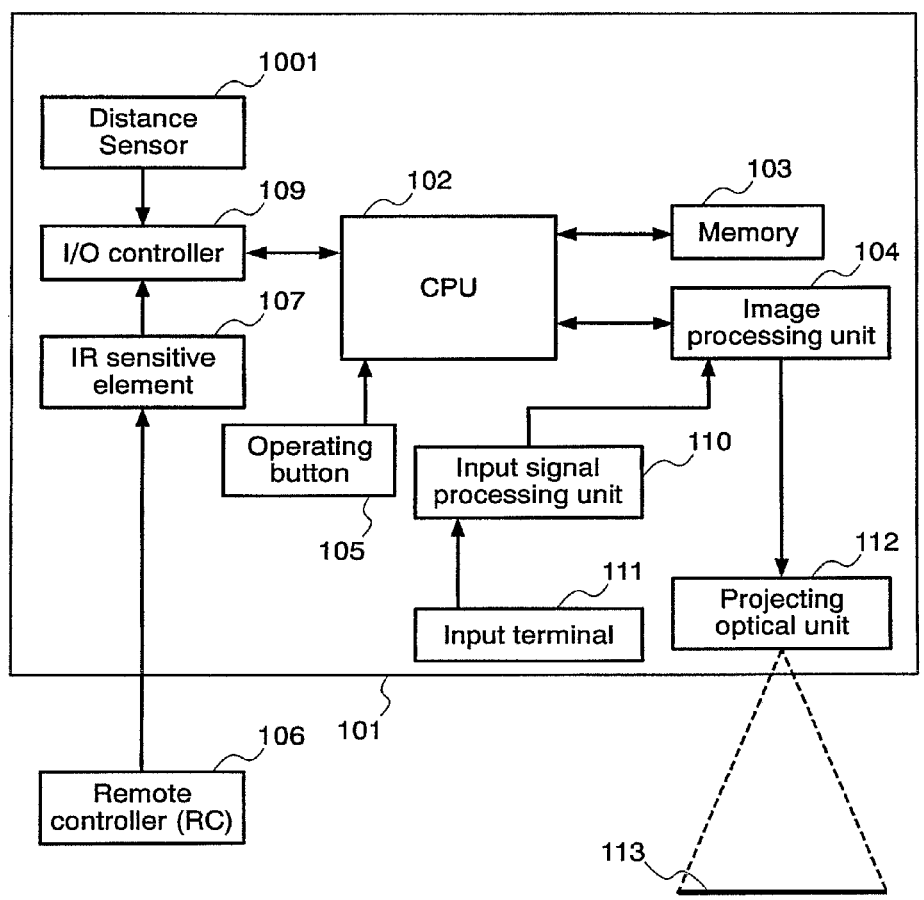
FIG. 10 is a block diagram of a projection type image display device according to a third embodiment.

A third embodiment will be described now. FIG. 10 is a block diagram showing a projection type image display device according to the third embodiment. While occurrence of a theft has been presumed in the first embodiment on the basis of a change in the attitude angle, a projected distance or a distance from a wall is detected in the third embodiment with use of the distance sensor 1001 as shown in FIG. 10 instead of the angle sensor 108 and a change in the place of installation as an aspect of the used conditions (refer to Table 1) is read out from a change in the detected distance and, on the basis of the change, occurrence of a theft is presumed. Otherwise the present embodiment is like the first embodiment and therefore explanation of the same will be omitted.

Figure 11:
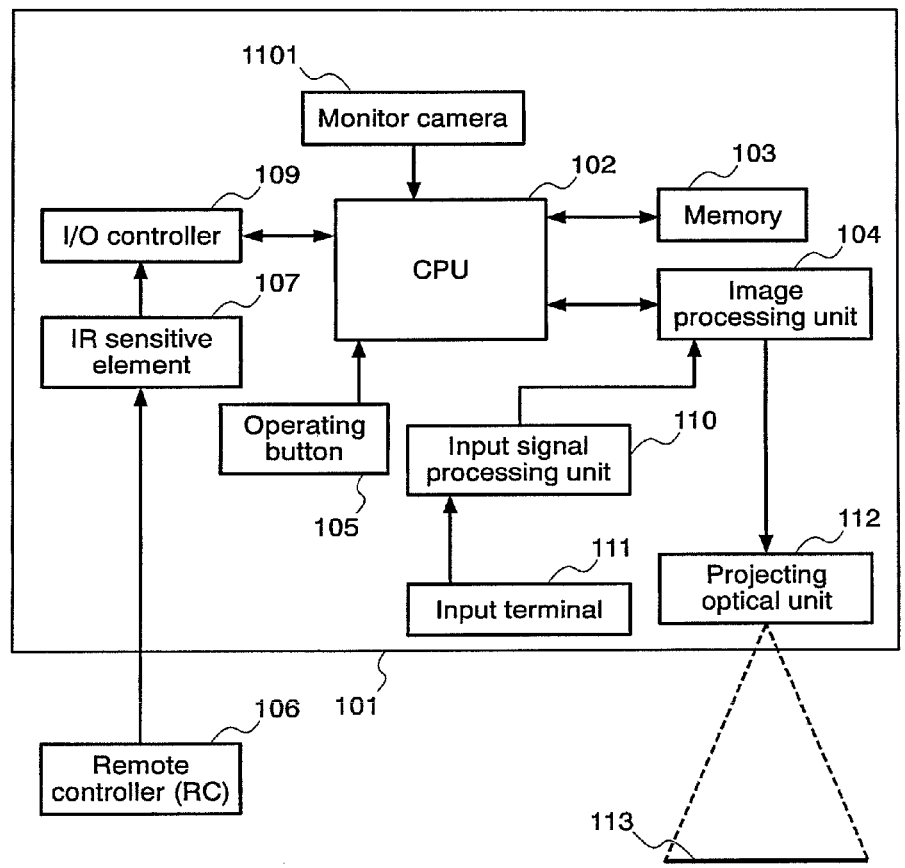
FIG. 11 is a block diagram of a projection type image display device according to a fourth embodiment.
Figure 12:
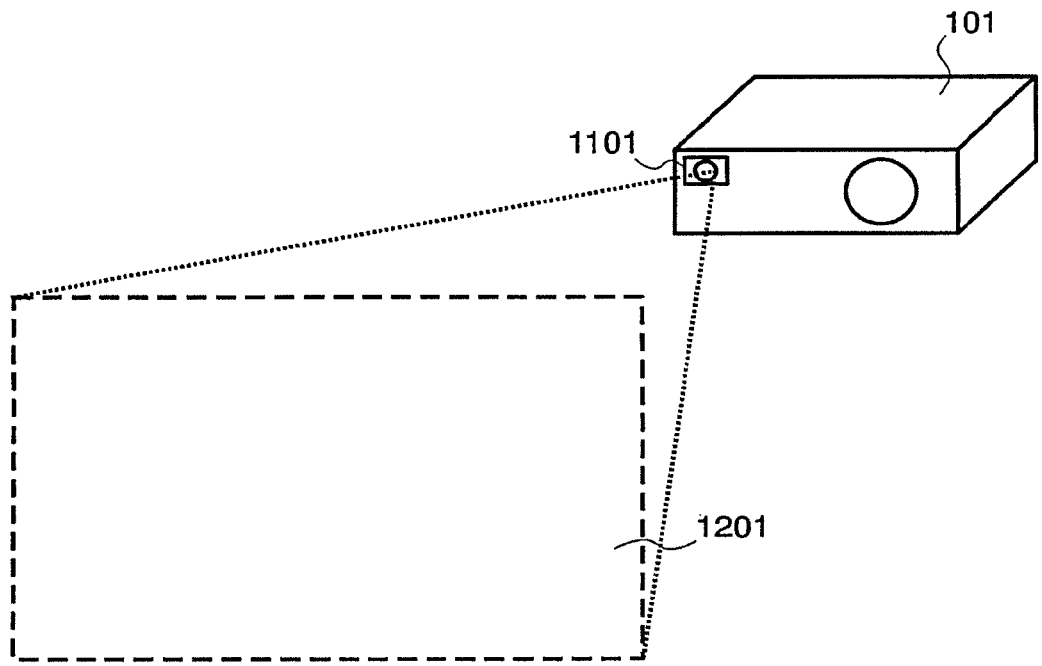
FIG. 12 is a drawing showing the fourth embodiment.

A fourth embodiment will be described below. FIG. 11 is a block diagram showing a projection type image display device according to the fourth embodiment. While occurrence of a theft has been presumed in the first embodiment on the basis of a change in the attitude angle, the CPU 102 in the fourth embodiment detects a landscape with use of the monitor camera 1101 shown in FIG. 11 instead of using the angle sensor 108 and reads out a change in the place of installation from a detected change in the landscape around the device, and thereupon presumes occurrence of a theft based on the readout change. As an example of detecting the landscape around the device, a method can be mentioned in which a monitor camera 1101 is disposed at a side of a projection lens and the landscape 1201 in the projected direction is detected and registered as the landscape around the device. If, in the above described method, a landscape other than the registered landscape has been detected, the normal operation of the apparatus thereafter may be inhibited.

Although, in the first embodiment, occurrence of a theft has been presumed on the basis of a change in the attitude of the device detected with use of an angle sensor, a fifth embodiment is carried out in the configuration of FIG. 1 but without using the angle sensor 108. In the present fifth embodiment, the CPU 102 detects a change in a signal input from the input terminal 111 with use of the input signal processing unit 110 and reads out, from the detected change in the signal, a change in the condition of an input to the input terminal, and thereby presumes occurrence of a theft. As an example of detecting a change in the input signal, such a method can be mentioned as to register a condition of an XGA, 85 Hz, signal being input to an RGB signal input terminal and to inhibit the normal operation of the device in the event that inputting of a signal other than the registered signal is detected.

Figure 13:
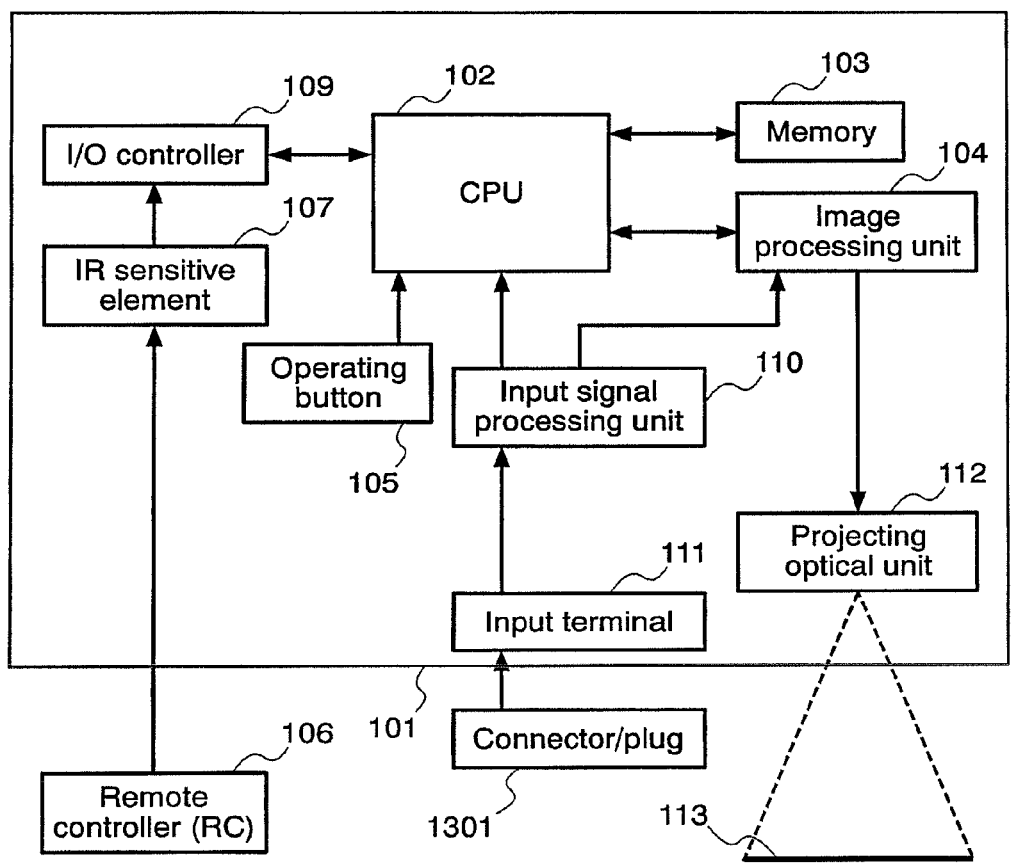
FIG. 13 is a block diagram of a projection type image display device according to a sixth embodiment.

A sixth embodiment will be described now. FIG. 13 is a block diagram showing a projection type image display device according to the sixth embodiment. Although, in the first embodiment, occurrence of a theft has been presumed on the basis of a change in the attitude of the device, the angle sensor 108 is not used in the sixth embodiment as shown in FIG. 13 but insertion of the connector or plug 1301 into the input terminal 111 is detected and a change in the condition of input to the input terminal is read out from whether or not the connector or plug 1301 is inserted, and thereby occurrence of a theft is presumed. As an example of detecting whether or not the connector or plug is inserted into the input terminal, such a method can be mentioned as to detect whether or not an RCA plug is inserted by using an RCA jack provided with a switch for the input terminal, and thereupon a condition of its being inserted is registered. And, then, if a state of the plug being not inserted is detected, a normal operation of the device is inhibited.

Figure 14:
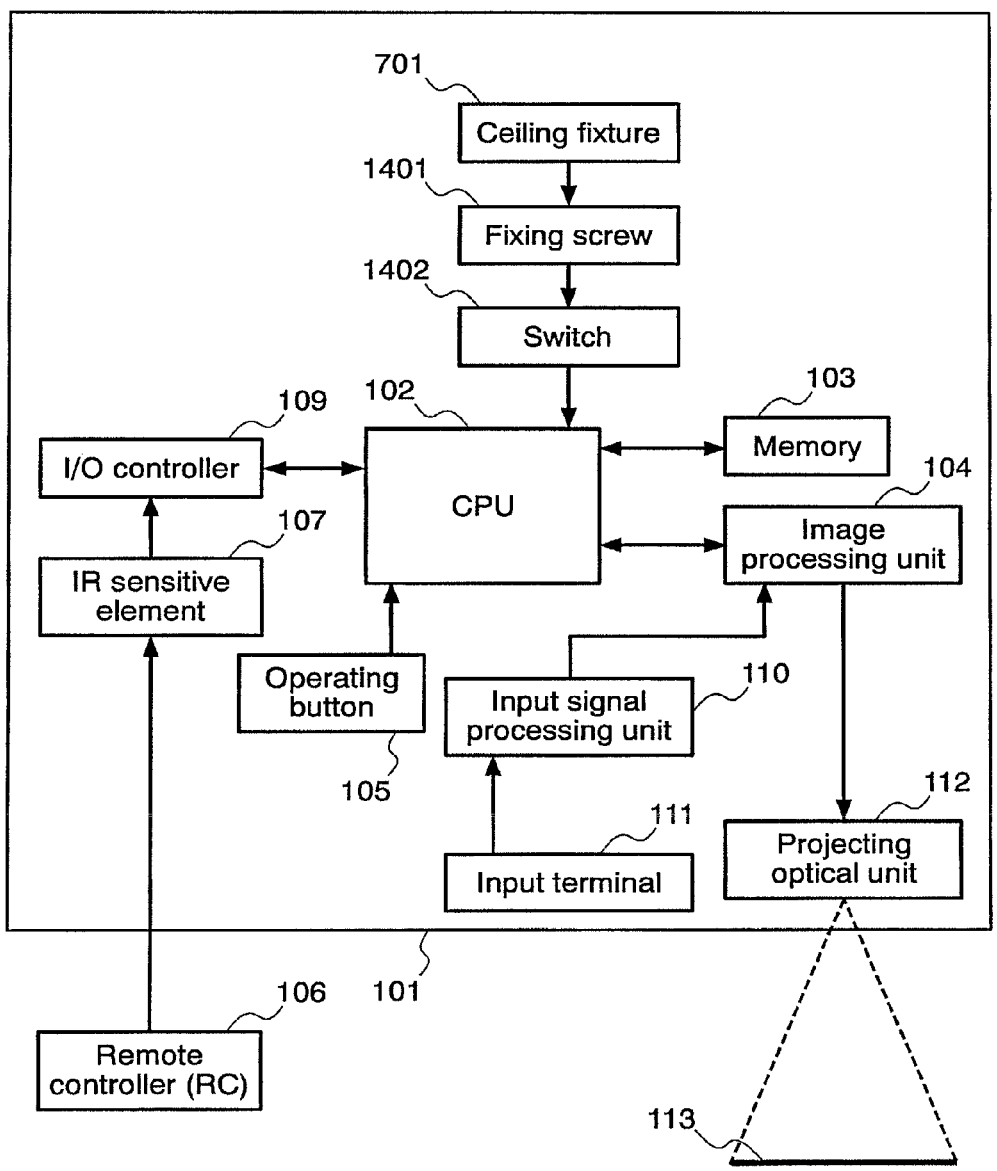
FIG. 14 is a block diagram of a projection type image display device according to a seventh embodiment.
Figure 15:
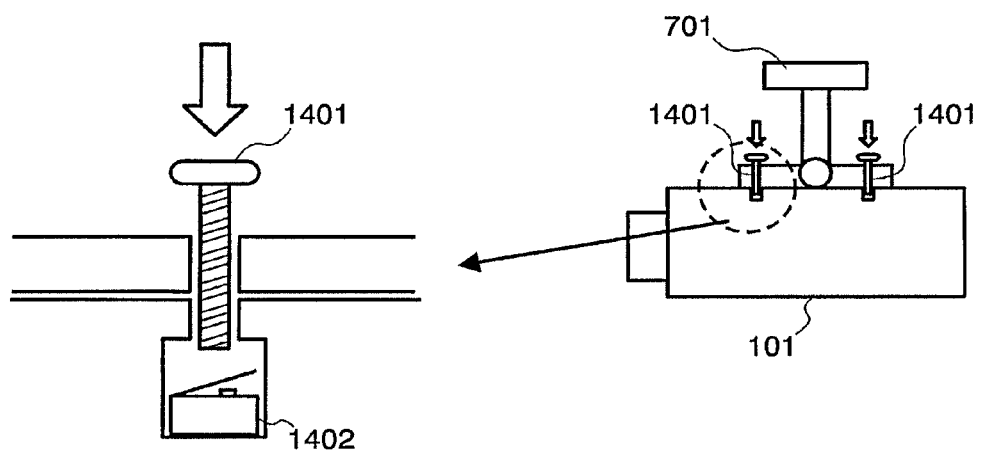
FIG. 15 is a drawing showing a fixed state of a projection type image display device.

A seventh embodiment will be described now. FIG. 14 is a block diagram showing a projection type image display device according to the seventh embodiment and FIG. 15 is a drawing showing the projection type image display device being in its fixed condition. Elements in FIG. 14 having corresponding functions to those of elements in FIG. 1 are denoted by corresponding reference numerals and description of the same is omitted.

The present embodiment is favorably applied to the arrangement of the projection type image display device 101 fixed for example onto the ceiling 702 by the use of the fixture (ceiling fixture) 701 as shown in FIG. 7. In the present embodiment, a change in the fixed condition is read out from whether or not the device is fixed to a fixing member (the ceiling in the present example) by the use of the fixing screw 1401 and the switch 1402 shown in FIG. 14 and FIG. 15 and occurrence of a theft is presumed on the basis of the read out change.

Figure 16:
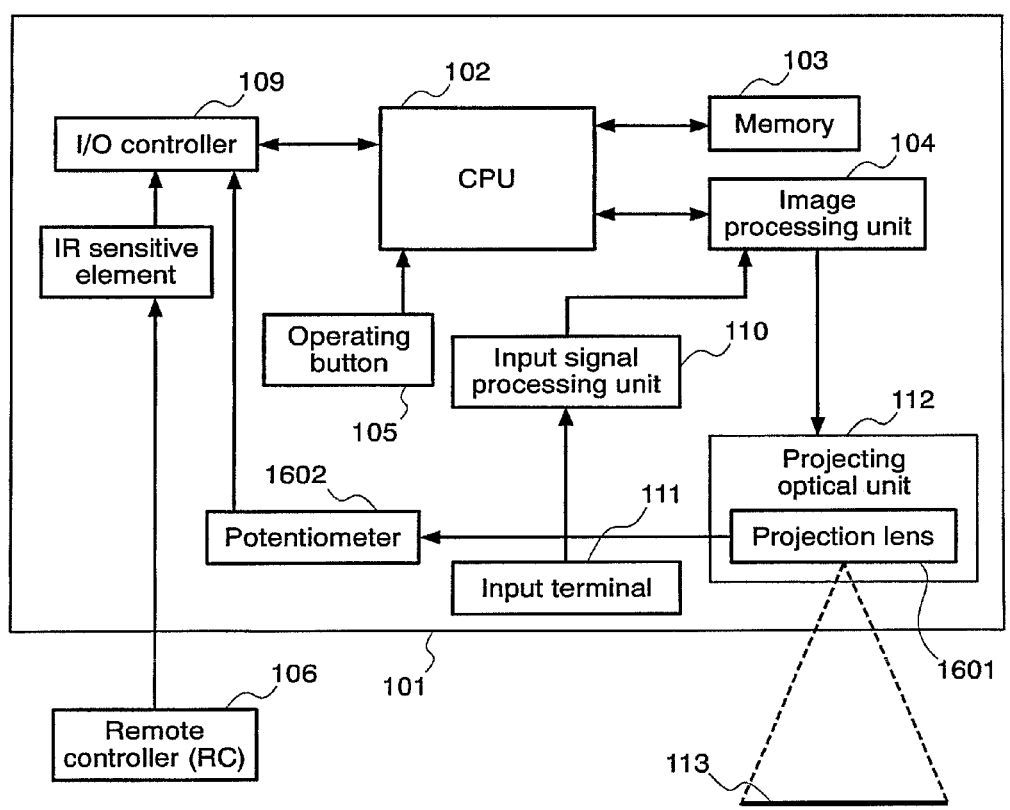
FIG. 16 is a block diagram of a projection type image display device according to an eighth embodiment.

While, in the first to seventh embodiments, occurrence of a theft has been presumed on the basis of a change in the "installed condition," of the used conditions shown in Table 1, i.e., a change in (1) attitude of device, (2) orientation of device, (3) place of installation, (4) condition of input into input terminal, and (5) fixed condition of device, the presumption of occurrence of a theft in an eighth embodiment is made on the basis of a change in "setup condition" of device. FIG. 16 is a block diagram showing the projection type image display device according to the eighth embodiment. Elements in FIG. 16 having functions like those of elements in FIG. 1 are denoted by like reference numerals and description thereof is omitted.

In the present embodiment, as shown in FIG. 16, the position of the projection lens 1601 of the projecting optical unit 112 is detected with use of the potentiometer 1602 and a change in the focus/zoom setup condition is read out from a detected change in the position of the projection lens, and on the basis of the detected change, occurrence of a theft resulting in an unauthorized use of the device is presumed.

Figures 24, 25:
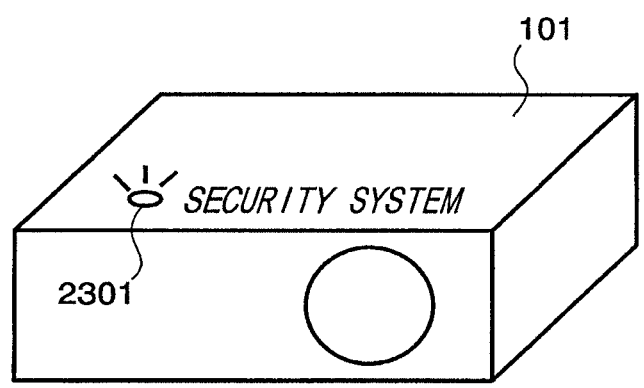
FIG. 24 is a drawing showing an example in which an alarm is given by lighting of an LED in the thirteenth embodiment.
FIG. 25 is a drawing showing correcting value storing areas in a nonvolatile memory 103 in a ninth embodiment.

A ninth embodiment will be described now. Instead of using a change in the zoom/focus setup condition detected with the use of the potentiometer for the presumption of occurrence of a theft in the eighth embodiment, a correcting value of the projection distortion (so-called keystone distortion) is used in the present ninth embodiment. Depending on the attitude of the device or the distance of the device to the screen, a distortion occurs in a projected image. Therefore, in order to compensate for the distortion, it is generally practiced to apply distortion correcting processing on the image data to be projected. In the present embodiment, parameters for the image correcting process are stored and recorded in the memory. The CPU 102 compares the projected image distortion (so-called keystone distortion) correcting value setup and recorded in the memory 103 by the user the last time with the projected image distortion correcting value previously registered by the rightful user, and thereby reads out a change in the projected image distortion correcting value and, on the basis of the change, presumes occurrence of a theft followed by an unauthorized use of the device. The hardware arrangement in this case is like that shown in FIG. 1 with the angle sensor 108 excluded therefrom. However, the nonvolatile memory 103 is arranged such that a storage area for storing a correcting value 1 that is registered by the rightful user according to the system start-up setting process of FIG. 2 and a storage area for storing a correcting value 2 that is changed in the course of other normal processing are separated from each other as shown in FIG. 25.

In the case of the present embodiment, the correcting value 2 that is revised while the device is being started up is used for detecting an unauthorized use. Therefore, up to one time of unauthorized use might be permitted. For example, when an unauthorized use preventing system by means of password check is not provided or a lock by means of password check is unjustly released, it becomes possible to make an unauthorized use. In the case of an unauthorized use, it frequently becomes necessary to revise the projection image distortion correcting value because the place of installation or position of installation varies. In such case, the revised value is stored in the nonvolatile memory 103 as the correcting value 2. More specifically, when a request is made for a revision of the correcting value, it is judged whether the system is in its course of processing the system start-up setting shown in FIG. 2 or in its course of processing a normal routine. If it is in the course of the system start-up setting, the correcting data is stored in the area of the correcting value 1, whereas if it is in the course of the normal routine, the correcting value 2 is stored in the area of the correcting value 2. At a start-up the next time, the stored correcting value 2 is compared with the correcting value 1 stored by the rightful user and if they do not coincide with each other, the operation is judged to be made by an unauthorized use.

Incidentally, the checkup of the correcting values may not necessarily be performed at power-on of the system but may be performed at predetermined timing. Such a system may also be made, in which, once power to a device is turned off at a power-off request, on condition that the correcting value 1 has not coincided with the correcting value 2 and a right password has not been input several times, starting up of the device the next time is inhibited. In this case, the nonvolatile memory 103 will be provided with a flag to inhibit a start-up of the device and a process to set this flag will be made at the time of the power-off. When the system is in its state starting up its unauthorized use preventing system, the start-up process will be started after checking the state of that flag inhibiting the start-up of the device.

Further, during the course of the above described processes in which the system start-up of FIG. 2 is performed at power-on of the device, if a change to the setting is made, even if it is made by a rightful user, a request for inputting a password according to FIG. 4 will without fail be made. Hence, it is desired that the system start-up of FIG. 2 is carried out immediately before a power-off request is made. Accordingly, the system may be adapted such that a popup suggesting the system start-up is displayed on the screen when there is made a power-off request. Otherwise, such a configuration may be made in which inputting of a password is requested when a change to the setting is made.

Although, referring to FIG. 25, a configuration has been described in which a first correcting value input by a rightful user and a second correcting value changed during the course of normal processing are separately stored in the memory 103 and the change to the correcting value is detected by comparing both the values, such a configuration may also be made in which the correcting value storage area is provided by one area and a flag indicating that a change has been made is stored in the memory 103. In this case, the CPU 102 may check the flag at predetermined timing, such as when the device is started up or the power is turned off, and thereby find that a change has occurred and put limitations on the use of the device. Further, while normal operations other than power-off were inhibited in the first embodiment when occurrence of a theft was presumed on the basis of a change made to the used condition of the device, it may be adapted in the case of the present embodiment such that the operation of changing the projected image correcting value is inhibited.

In a tenth embodiment, the CPU 102 compares the condition of a projected image inversion setting (so-called, mirror setting) set up by the user of the device last and recorded in the memory 103 with the condition of a projected image inversion setting previously registered by a rightful user, reads out a change in the condition of the projected image inversion setting, and presumes occurrence of a theft followed by an unauthorized use. Also in this embodiment, a set condition 1 registered by the rightful user through the processes of FIG. 2 and a set condition 2 set by the rightful user or an unauthorized user in normal conditions are respectively stored in separate storage areas of the nonvolatile memory 103. As with the ninth embodiment, at least one time of unauthorized use might be permitted. The condition 2 of the projected image inversion setting set up at this time and the set up condition 1 are compared with each other and occurrence of an unauthorized use is detected according to whether the contents of the setting coincide or not. As with the ninth embodiment, the timing of the comparison is not limited to that of power-on. Although, in the case of the first embodiment, a change in the used condition of the device was read out and normal operations other than turning off of the power were inhibited when a theft is presumed on the basis of the read out, an operation to change the projected image inversion setting may be inhibited in the case of the present embodiment.

While the first embodiment to the tenth embodiment have been described above, the examples of the installed conditions of the device in the first to tenth embodiments, i.e., (1) the attitude, (2) the orientation, (3) the place of installation, (4-1) the input signal to the input terminal, (4-2) whether a plug or connector is inserted into the input terminal and (5) whether the device is fixed to a fixing member, and the examples of setup condition of the device described in the eighth to tenth embodiments; i.e., (1) focus/zoom setup condition of the lens, (2) the projected image distortion correcting value, and (3) the projected image inversion setup condition may be combined at will. By using combination at will of these conditions, the accuracy of presumption of occurrence of a theft and an unauthorized use that follows can be enhanced.

An eleventh embodiment will be described now. By providing the RC 106 with a function of outputting a signal for releasing an unauthorized use preventing system, the user authentication performed by means of a password check in embodiment 1 can also be performed by the releasing signal from the RC.

Figure 17:
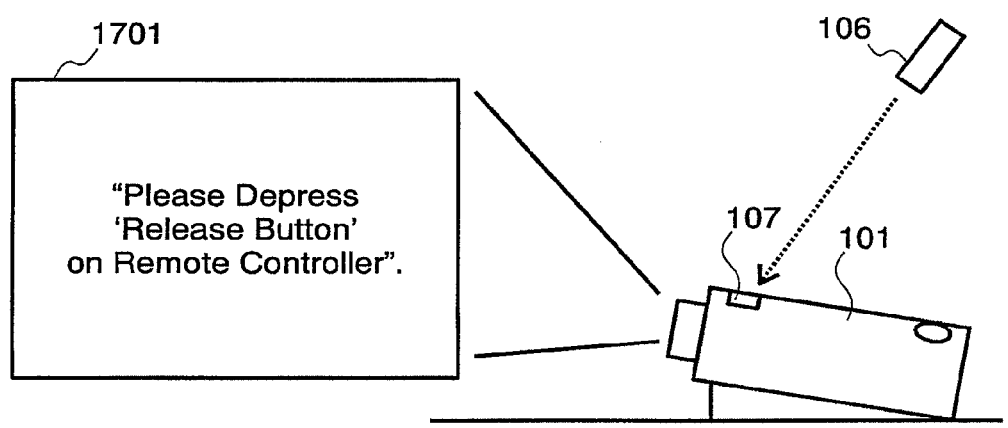
FIG. 17 is a drawing showing release of the unauthorized use preventing system according to a tenth embodiment.

When the used condition of the device detected when the device is started up and the registered used condition are different, the CPU 102 displays the screen 1701 requesting for depressing a release button on the RC as shown in FIG. 17 and inhibits normal operations other than the power-off operation until it receives the system releasing signal from the RC. When the system releasing signal is received, it erases the screen 1701 requesting for depressing the release button and enables normal operations. If the rightful user keeps the device and the RC in different places so as to prevent the theft of both the RC and the device at the same time, it is made possible to provide the release button on the RC with a function equal to that of a password. Thus the present embodiment can provide the same advantage as obtained in the first embodiment.

Figure 18:
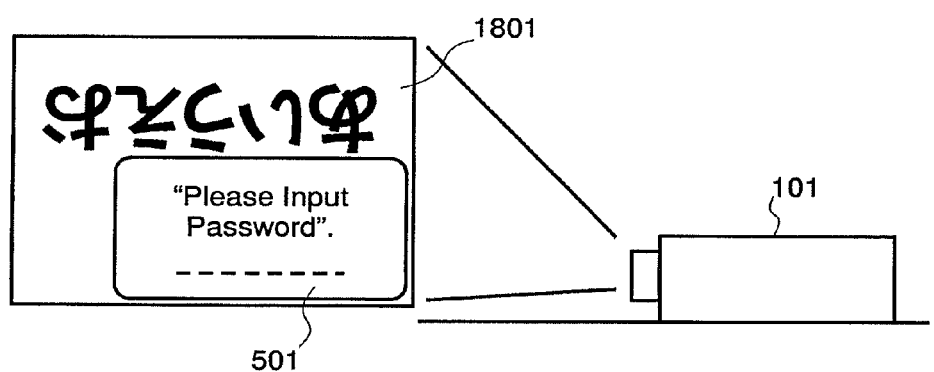
FIG. 18 is a drawing showing a screen of a twelfth embodiment in which an image is inversed up-side-down.
Figure 19:
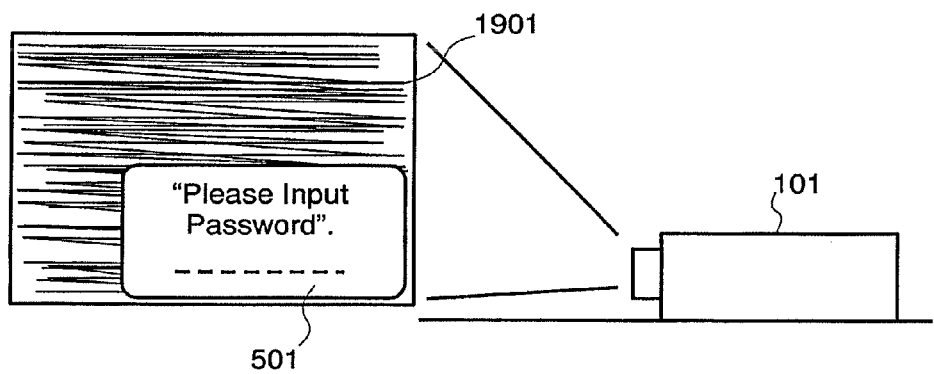
FIG. 19 is a drawing showing a screen of the twelfth embodiment in which an image is scrambled.
Figure 20:
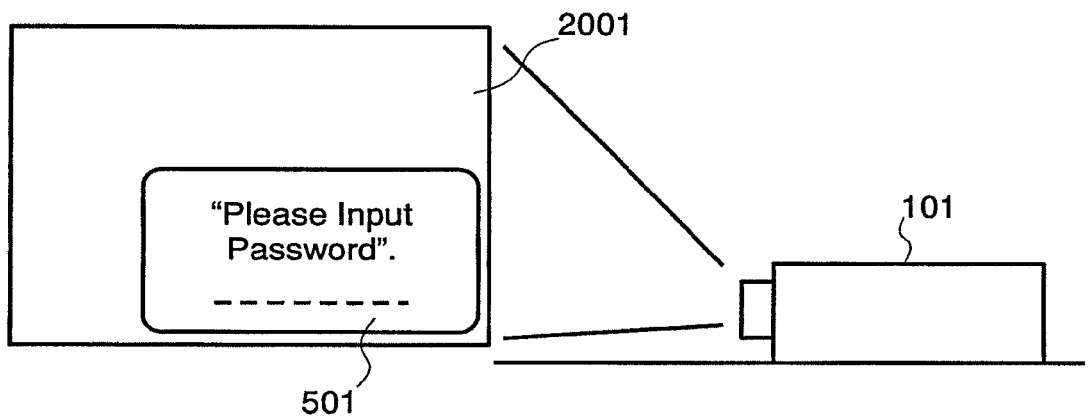
FIG. 20 is a drawing showing a screen of the twelfth embodiment in which an image is blanked.
Figure 21:
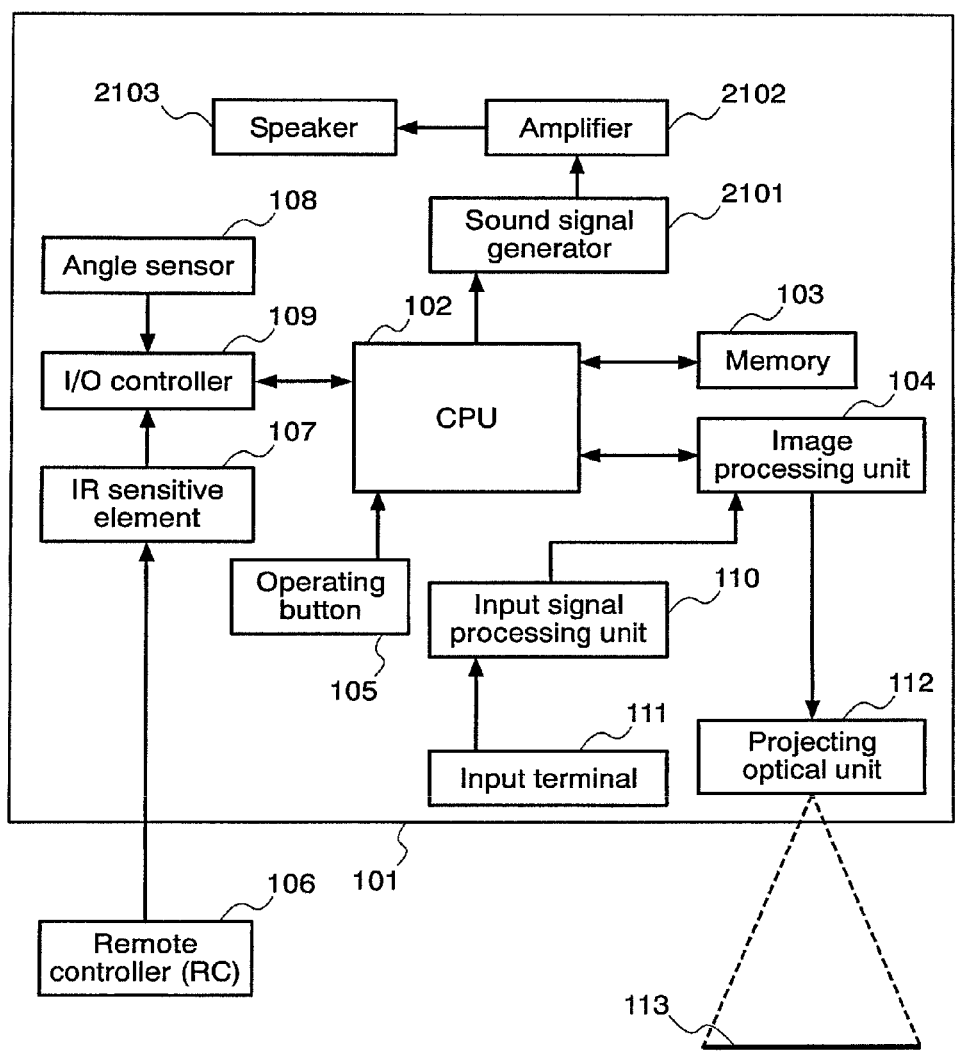
FIG. 21 is a block diagram of twelfth embodiment in which an alarm is given.
Figure 22:
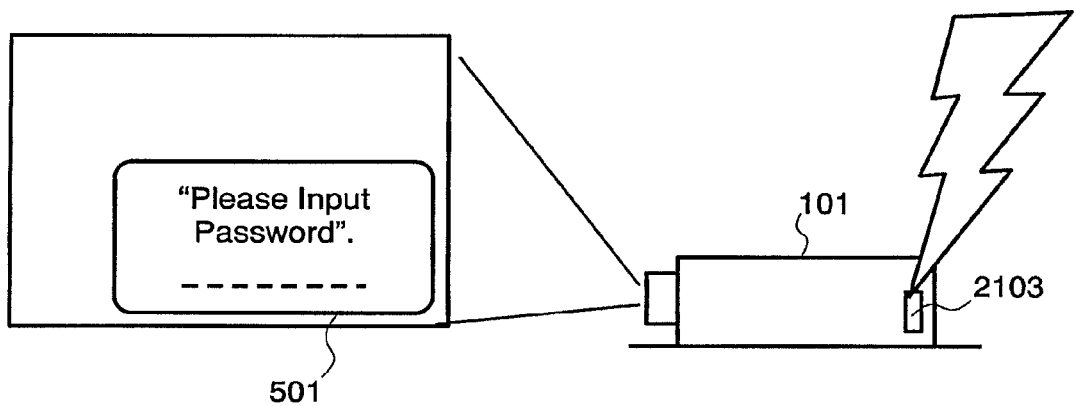
FIG. 22 is a drawing showing the screen of the twelfth embodiment in which an alarm is given.

Although, in the first embodiment, it is arranged, when the used condition detected at the time of starting up of the projection type image display device is different from the registered used condition, such that the normal operations of the device is inhibited, but the manner of restriction is not limited to this. When it is aimed not to allow the device to operate normally, the device may be caused to make an abnormal operation. For example, the inverted screen 1801 processed to look up-side-down as shown in FIG. 18 may then be constantly displayed. Or, the scrambled screen 1901 processed to be scrambled as shown in FIG. 19, or the blank screen 2001 as shown in FIG. 20 may be displayed. Further, as shown in FIG. 21 and FIG. 22, the sound signal generator 2101, amplifier 2102, and built-in speaker 2103 may be provided on the projection type image display device so that an alarm is given.

Figure 8:
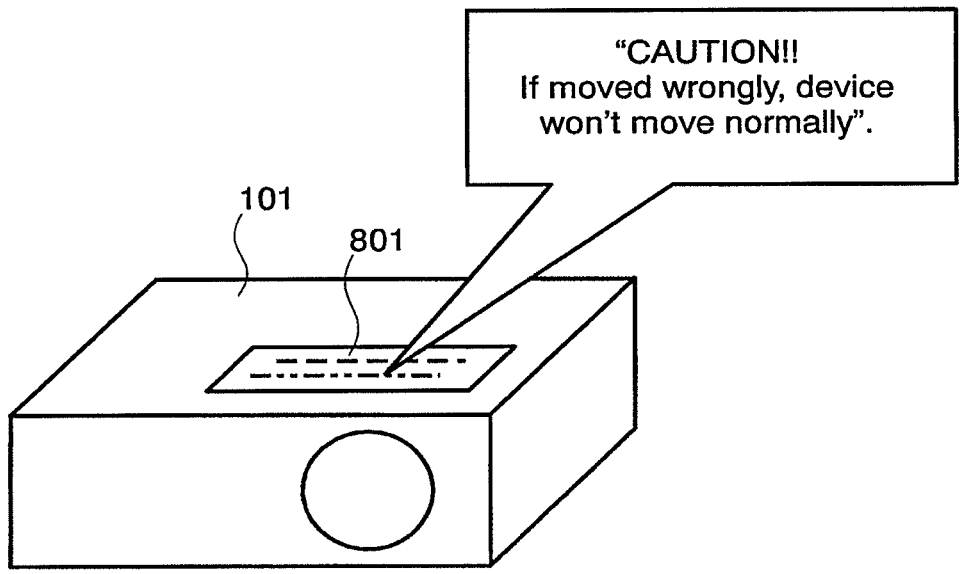
FIG. 8 is a drawing showing an example of giving an alarm with use of a logo seal.
Figure 23:
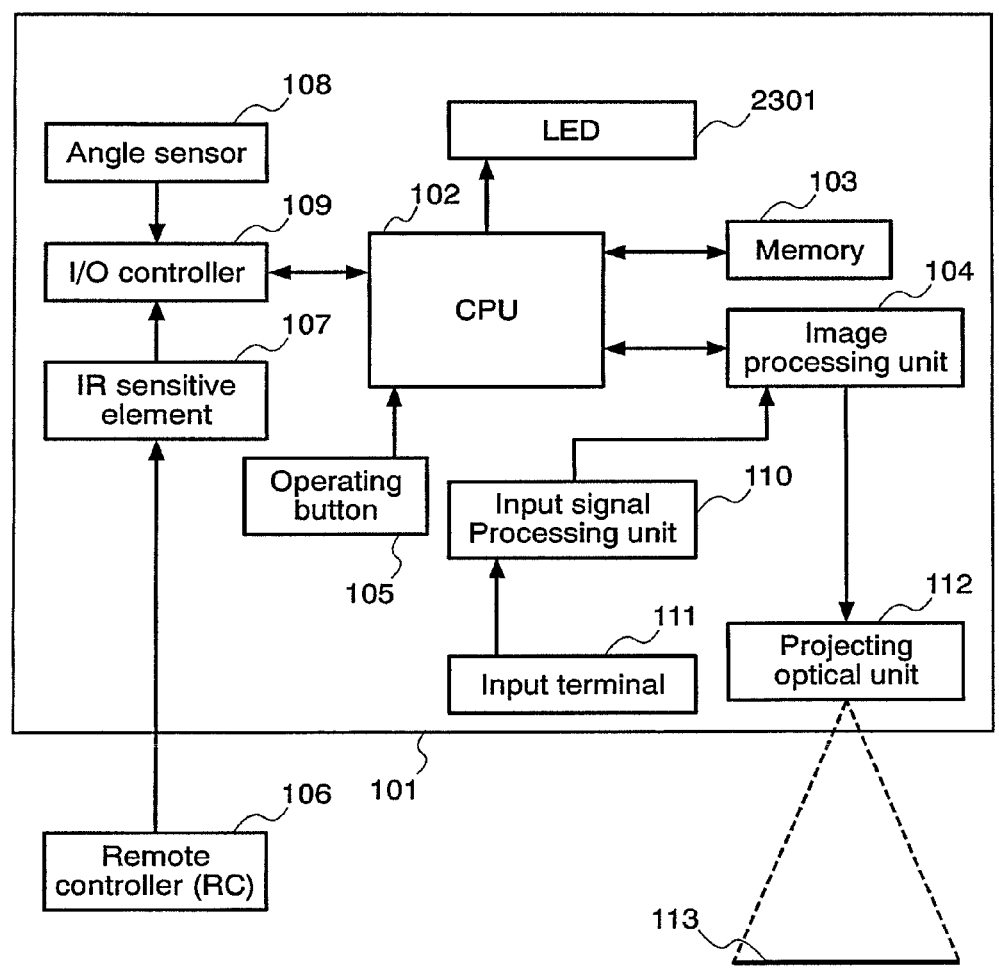
FIG. 23 is a block diagram of a projection type image display device according to a thirteenth embodiment.

A thirteenth embodiment will now be described. In the present embodiment, instead of the logo seal 801 shown in FIG. 8 that was described at the end of the description of the first embodiment, there is provided an LED 2301 as shown in FIG. 23 and the LED 2301 is placed on the enclosure of the image display device 201 at its portion easily seen from the surrounding as shown in FIG. 24. While the unauthorized use preventing system is being started up, the LED 2301 is lighted or flashed on and off to notify the surrounding people of the start-up of the unauthorized use preventing system so as to effectively prevent a theft of the device.

TABLE 1

| | Example | Object to be detected |
|---|---|---|
| Installed condition | ① Attitude of Device | Angle with Gravity |
| | ② Orientation of Device | Direction of Installed Device |
| | ③ Place of Installation | Landscape around Device, etc. |
| | | Projected distance, Distance from Wall, etc. |
| | ④ Condition of Input to Input Terminal | Types of Input Signal, etc. |
| | | Whether Connector/Plug is put in, etc. |
| | ⑤ Fixing Condition of Device | Whether Device is fixed, etc. |
| Setup Condition | ① Lens Focus, Zoom Setup Condition | Position of lens, etc. |
| | ② Projected Image Distortion Correcting Value | Recorded Correcting Value in Memory, etc. |
| | ③ Projected Image Inversion Setup Condition | Setup Condition Recorded in Memory, etc. |

What is claimed is:

1. A projector comprising:
   a controller to operate the projector, which is configured to restrict a use of the projector;
   a memory to store information of a plurality of kinds of conditions in an authorized use of the projector and a password for releasing a restriction on a use of the projector;
   a detector to detect a use condition of the projection; and
   a projection unit to project an image,
   wherein, at a power-on timing, the controller selects a process of starting an operation of the projector among the plurality of processes including:
   (1) a first process in which use of the projector is restricted and a password verification operation is executed before starting a normal operation; and
   (2) a second process in which a normal operation is started without password verification operation even if a password for restricting use of the projector is registered,
   wherein, the first process is selected by the controller in a case that in at least one kind of the conditions a use condition detected by the detector does not match the condition stored by the memory, and the projection unit projects an image for prompting a user to input a password in the password verification operation,
   wherein, the controller releases the restrictions on the use of the projector if a password inputted in the password verification operation matches the password stored in the memory;
   wherein the plurality of kinds of conditions stored in the memory include a condition of an orientation of the projector, a condition of input to an input terminal of the projector and a condition of fixing the projector.

2. The projector according to claim 1, wherein the condition of an orientation of the projector is determined based on an orientation detected by a geomagnetic sensor.

3. The projector according to claim 1, wherein the condition of input to an input terminal of the projector is determined based on a change in a signal input from the input terminal or a detection of whether or not a connector or plug is inserted in the input terminal.

4. The projector according to claim 1, wherein the condition of fixing the projector is determined based on a determination as to whether or not the projector is fixed to a fixing member.

5. The projector according to claim 1, wherein the condition of an orientation of the projector is determined from an orientation detected by a geomagnetic sensor, wherein the condition of input to an input terminal of the projector is determined from a change in a signal input from the input terminal or a detection of whether or not a connector or plug is inserted in the input terminal, and wherein the condition of fixing the projector is determined based on a determination as to whether or not the projector is fixed to a fixing member.

6. The projector according to claim 1, further comprising an alarm unit to provide an alarm indicating that a restriction of use of the projector will be executed, when in at least one kind of the conditions a use condition detected by the detector does not match the condition stored by the memory.

7. The projector according to claim 1, wherein the condition of input to an input terminal of the projector is determined based on a change in a resolution or a frequency of a video signal input to the input terminal.

8. A projector comprising:
   a controller to operate the projector, which is configured to restrict a use of the projector;
   a memory to store information of a plurality of kinds of conditions in an authorized use of the projector and a password for releasing a restriction on a use of the projector;
   a detector to detect a use condition of the projector; and
   a projection unit to project an image,
   wherein, at a power-on timing, the controller selects a process of starting an operation of the projector among the plurality of processes including:
   (1) a first process in which use of the projector is restricted and a password verification operation is executed before starting a normal operation; and
   (2) a second process in which a normal operation is started without password verification operation even if a password for restricting use of the projector is registered,
   wherein, the first process is selected by the controller in a case that in at least one kind of the conditions a use condition detected by the detector does not match the condition stored by the memory, and the projection unit projects an image for prompting a user to input a password in the password verification operation,
   wherein, the controller releases the restrictions on the use of the projector if a password inputted in the password verification operation matches the password stored in the memory;
   wherein the plurality of kinds of conditions stored in the memory include a condition of an attitude of the projector, a condition of an orientation of the projector, a condition of input to an input terminal of the projector and a condition of fixing the projector; and
   wherein the condition of an attitude of the projector is determined from an angle of the projector detected by an angle sensor.

9. The projector according to claim 8, wherein the condition of an orientation of the projector is determined based on an orientation detected by a geomagnetic sensor.

10. The projector according to claim 8, wherein the condition of input to an input terminal of the projector is determined based on a change in a signal input from the input terminal or a detection of whether or not a connector or plug is inserted in the input terminal.

11. The projector according to claim 8, wherein the condition of fixing the projector is determined based on a determination as to whether or not the projector is fixed to a fixing member.

12. The projector according to claim 8, wherein the condition of an orientation of the projector is determined from an orientation detected by a geomagnetic sensor, wherein the condition of input to an input terminal of the projector is determined from a change in a signal input from the input terminal or a detection of whether or not a connector or plug is inserted in the input terminal, and wherein the condition of fixing the projector is determined based on a determination as to whether or not the projector is fixed to a fixing member.

13. The projector according to claim 8, further comprising an alarm unit to provide an alarm indicating that a restriction of use of the projector will be executed, when in at least one kind of the conditions a use condition detected by the detector does not match the condition stored by the memory.

14. The projector according to claim 8, wherein the condition of input to an input terminal of the projector is determined based on a change in a resolution or a frequency of a video signal input to the input terminal.

\* \* \* \* \*